(12) United States Patent
Goldsmith

(10) Patent No.: US 10,709,075 B2
(45) Date of Patent: Jul. 14, 2020

(54) PLANT COLLARS

(71) Applicant: Michael W. Goldsmith, Portland, OR (US)

(72) Inventor: Michael W. Goldsmith, Portland, OR (US)

( * ) Notice: Subject to any disclaimer, the term of this patent is extended or adjusted under 35 U.S.C. 154(b) by 0 days.

(21) Appl. No.: 16/686,381

(22) Filed: Nov. 18, 2019

(65) Prior Publication Data

US 2020/0107509 A1  Apr. 9, 2020

Related U.S. Application Data

(63) Continuation of application No. 14/215,466, filed on Mar. 17, 2014, now Pat. No. 10,517,241.

(60) Provisional application No. 61/802,588, filed on Mar. 16, 2013.

(51) Int. Cl.
*A01G 31/02* (2006.01)

(52) U.S. Cl.
CPC .................................... *A01G 31/02* (2013.01)

(58) Field of Classification Search
CPC .. A01G 31/02; A01G 31/001; A01G 13/0281; A01G 13/0256; A01G 13/0268
USPC ....................................................... 47/62 A
See application file for complete search history.

(56) References Cited

U.S. PATENT DOCUMENTS

| | | | |
|---|---|---|---|
| 5,323,566 A * | 6/1994 | Mills | A01G 13/10 47/30 |
| 5,347,750 A * | 9/1994 | Mills | A01G 13/0243 47/30 |
| 8,291,639 B2* | 10/2012 | Gardner | A01G 9/16 47/60 |
| 8,745,920 B1* | 6/2014 | Mills | A01G 13/0243 47/29.6 |
| 2006/0032125 A1* | 2/2006 | Kruer | A01G 25/02 47/59 R |

FOREIGN PATENT DOCUMENTS

| | | | | |
|---|---|---|---|---|
| FR | 2615353 A3 * | 11/1988 | ......... | A01G 13/0281 |
| GB | 2088185 A * | 6/1982 | ......... | A01G 13/0281 |

* cited by examiner

*Primary Examiner* — Monica L Barlow
*Assistant Examiner* — Aaron M Rodziwicz
(74) *Attorney, Agent, or Firm* — Mohr Intellectual Property Law Solutions, PC

(57) ABSTRACT

Hydroponics plant collars including a body defining a thickness, a center, and a periphery, a slot extending from the periphery and generally toward the center, a terminus of the slot and a surface thereof, and two opposing slot surfaces which define smooth plant contact portions thereof and which are spaced apart from one another whereby the body distributes forces acting on the hydroponics plant collar and on a plant to be in the slot, and metallic nanospheres dispersed throughout the body.

20 Claims, 9 Drawing Sheets

PLANT COLLARS

CROSS REFERENCE TO RELATED APPLICATIONS

This application claims priority to U.S. provisional patent application No. 61/802,588 filed on Mar. 16, 2013, and to nonprovisional patent application Ser. No. 14/215,466, filed on Mar. 17, 2014, the entirety of these applications are incorporated herein as if set forth in full.

BACKGROUND

For a number of reasons, hydroponics has become an increasingly popular method for the propagation and cultivation of plants. Those employing hydroponics, for one, attain improved conservation and control of water, mineral nutrients, and supplements. This improved control can translate to enhanced vegetative and generative growth. A more recent development in the hydroponics industry is that of aeroponics, where the plant's roots are bare (without medium) within a chamber in which they are intermittently misted with nutrient solution.

With traditional hydroponics, the roots intercalate the growth media and are periodically submerged in water (as is done in, for instance, 'ebb and flow hydroponic' systems). With 'deep water culture' hydroponics, bare roots are continuously submerged in a porously aerated nutrient solution. Aeroponics is a method for propagating cuttings (colloquially known as cloning) which is favored by many in the hydroponics industry. These systems often attempt to automate the process of cloning by requiring less maintenance and attention as compared to propagating cuttings in media or soil. Moreover, such systems have become known as 'cloning machines', 'aeroponic cloners', cloners, etc. and are made by a number of manufacturers. Many cloning machines include a reservoir, tub, or grow chamber, a combination of pumps for air and/or water distribution; misters or sprayers for wetting the cuttings' stems; and lids which hold a plurality of cuttings. Various plant collars hold the cuttings in generally fixed relationships to the lids of these cloning systems.

However, heretofore-available plant collars suffer from a number of problems. For one thing, they cannot be cleaned or sterilized without shortening their service lives. Moreover, they tend to fail mechanically after several uses and can even introduce cleaning chemicals (which they have absorbed or adsorbed) into the plants that they hold. In addition, they tend to induce root growth at undesirable locations on the cloned plants thereby resulting in subsequent difficulties when the clones are transplanted. In the alternative, or in addition, the roots can grow into heretofore-available plant collars leading to their breakage when mature plants are subsequently removed from the cloning machines. Furthermore, they harbor water leading to the growth of fungus and/or other pathogens that can harm the health of the plants or even kill them.

SUMMARY

The following presents a simplified summary in order to provide an understanding of some aspects of the disclosed subject matter. This summary is not an extensive overview of the disclosed subject matter, and is not intended to identify key/critical elements or to delineate the scope of such subject matter. A purpose of the summary is to present some concepts in a simplified form as a prelude to the more detailed disclosure that is presented herein. The current disclosure provides plant collars and related systems, apparatus, methods, etc.

Embodiments provide plant collars capable of maintaining their physical properties while withstanding multiple methods of sterilization, including, but not limited to, microwaving, steam autoclaving, exposure to dry heat, gamma radiation, ethylene oxide, electron beam radiation, or ultraviolet light, etc. In some embodiments the plant collar comprises microwave-absorbing materials and/or reduced metals to facilitate shorter and/or more effective microwave sterilization. Plant collars of embodiments possess features which reduce the forces placed on the stems of the plants which they hold. In some embodiments plant collars contain topological chemicals and/or material attributes which repel and/or hinder colonization by bacteria, fungi, other (potential) pathogens, and/or plant roots.

In some embodiments plant collars possess features rendering them resistant to cyclic compression during plant loading/unloading cycles. For instance, some collars are made from closed cell foam polymers and/or copolymers having relatively low compression sets. Plant collars can be made, for instance, from polymers with compression sets below five percent per ASTM (American Society for Testing and Materials) protocol D 1056. Plant collars so made can resist structural changes during cyclic use.

Collars of embodiments can resist ultraviolet (UV) light. For instance, some collars can exhibit no (or minimal) degradation as measured per protocol J1960 of the Society of Automotive Engineers (SAE). Thus, these collars can endure exposure to high-intensity lighting and/or solar radiation. Such plant collars can, in addition, or in the alternative, also tolerate reactive gases and/or other chemicals (including, but not limited to, ozone, oxygen, chlorine, aqueous acids, bases, minerals, peroxides, and/or hypochlorite salts) so that, even with sustained use in the hydroponics industry (or other industries), degradation of these plant collars is relatively negligible. Furthermore, collars of embodiments can be made so that they are in compliance with Food and Drug Administration (FDA) standards such as Code of Federal Regulations Title 21 "Food and Drugs", Chapter I "Food and Drug Administration Department of Health and Human Services", Subchapter 13 "Food for Human Consumption", part 177 "indirect food additives: polymers", subchapter C "substance for use only as a component of articles intended for repeated use."

In some embodiments, plant collars comprise elliptical bodies which define respective radii, thicknesses, centers, and peripheries. The bodies further define slots extending from the peripheries and generally toward the centers. Furthermore, the bodies define slot termini and slot surfaces which are substantially free of stress risers. The bodies of the current embodiment define opposing slot surfaces which are spaced apart from one another in the current embodiment. If desired, the slot walls can converge near the peripheries of the bodies and/or the surfaces of the termini can be semicircular. Moreover, collars of some embodiments possess a variety of mechanical and/or chemical properties. For instance, some collar bodies possess compressive strengths which allow about a 25% deflection when a pressure between about 3 and 10 psi is applied thereto. Some collar bodies further comprise metallic particles dispersed throughout them and these particles can be metal-coated nanospheres.

Various embodiments provide plant collars wherein each body defines a radius, a thickness, a center, and a periphery and further defines a slot extending from the periphery and toward the center. Additionally, these bodies further define smooth plant contact surfaces in the slots and volumes in the bodies which are adjacent to the smooth plant contact surfaces. These volumes further comprise closed cell foam in the current embodiment. If desired, the closed cell foam can be silicone based and/or the bodies can further comprise particles distributed through the bodies which selectively absorb microwave radiation. Those particles can be metallic and/or can be metallic nanospheres.

Plant collars of some embodiments each comprise a body defining a periphery, a slot, a slot wall, and a plant contact area of the slot wall. The plant contact area is made of a closed cell, silicone based, cellular elastomer which to comprises a species which selectively absorbs microwave radiation. That microwave absorbing species can be metallic and/or, more specifically, can contain iron. For instance, the metallic species can be metal oxides such as iron (III) oxide ($Fe_2O_3$), calcium oxide (CaO), etc. In the alternative, or in addition, the microwave absorbing species can be coated on nanospheres. With respect to other considerations, the volume adjacent to the plant contact surface can absorb no more than about 5% (or 2%) water by weight and/or it can be chemically compatible with ethylene oxide. Furthermore, the body can be elliptical in shape and/or the slot can converge near the periphery.

Collar for plants (namely, cuttings, seedlings, or mature plants of monocotyledons or dicotyledons) are provided which are sterilizable and/or reusable. Collars of the current embodiment receive plants such that their taproot, lateral roots or cut stems protrude below the collars and the foliar portions of the plants are above the collars. The collars can maintain their physical properties which allow for durable use and do not impede plant growth while affixing and suspending the plants in aeroponic (or hydroponic) growing systems. Some plant collars are composed of polymers or copolymers which tolerate chemical, heat and/or electromagnetic sterilization. These plant collars can be sterilized (in part) because they include microwave-absorbing substances in their bodies which allow for more effective microwave absorption and related heat generation. They may also be absorbed through direct heat absorption in concert with constituents which facilitate effective heat transfer through, for instance, possessing high thermal conductivity. Plant collars of embodiments, moreover, embody novel and non-obvious chemical, structural, and/or topological designs which enhance root growth, decrease colonization by microorganisms, and/or improve force distributions between the plant collars, the plants and/or other components of the hydroponic systems.

Other embodiments provide durable, sterilizable plant collars made of natural and/or synthetic, closed-cellular polymers and/or copolymers. These collars can be reused to affix plant stems in aeroponic and/or hydroponic systems for their propagation, cloning and/or cultivation. Moreover, these plants can be placed in the collars as cuttings, seedling, etc. and can be monocotyledons, dicotyledons or other types of plants. For instance, the plants can be various species of legumes (pea, beans, lentils, peanuts) daisies, mint, lettuce, tomato, oak, tree, grains, (for instance, wheat, corn, rice, millet) lilies, daffodils, sugarcane, banana, palm, ginger, onions, bamboo, sugar, cone, palm tree, banana tree, grass, etc. without departing from the scope of the current disclosure.

To the accomplishment of the foregoing and related ends, certain illustrative aspects are described herein in connection with the annexed figures. These aspects are indicative of various non-limiting ways in which the disclosed subject matter may be practiced, all of which are intended to be within the scope of the disclosed subject matter. Other novel and nonobvious features will become apparent from the following detailed disclosure when considered in conjunction with the figures and are also within the scope of the disclosure.

BRIEF DESCRIPTION OF THE FIGURES

The detailed description is described with reference to the accompanying figures. In the figures, the left-most digit(s) of a reference number usually corresponds to the figure in which the reference number first appears. The use of the same reference numbers in different figures usually indicates similar or identical items.

DETAILED DESCRIPTION

This document discloses plant collars and related systems, apparatus, methods, etc. and, more specifically, durable and reusable plant collars which can be sterilized with various chemicals while neither absorbing them nor re-releasing them in significant quantities when exposed to typical hydroponic/aeroponic environments. In other words, collars of embodiments are chemically compatible with chemicals often used in the hydroponics, aquaponics, and/or aeroponics industries.

Figure 1:
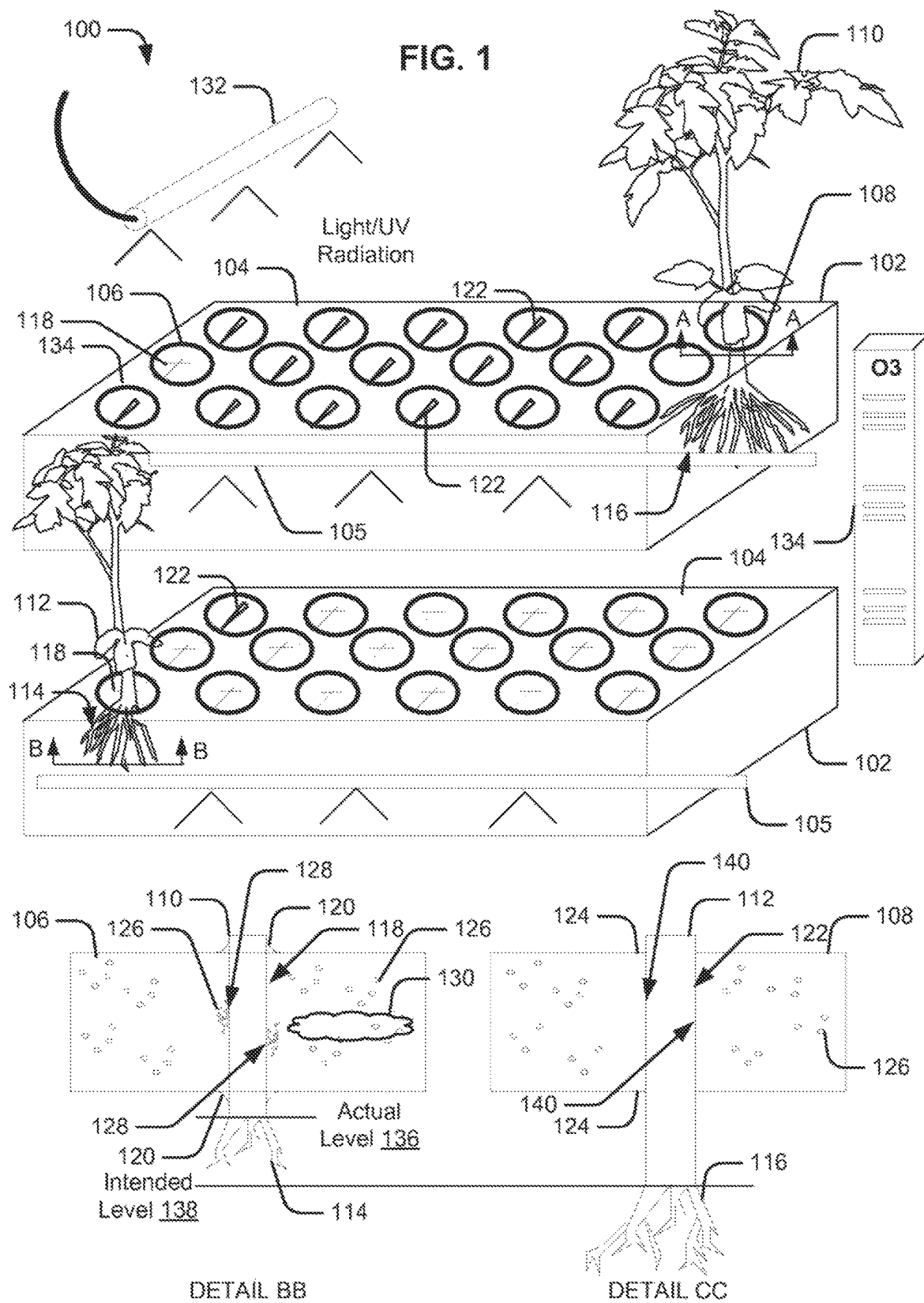
FIG. 1 illustrates an aeroponics system.

FIG. 1 illustrates an aeroponics system. Generally, users want to use the aeroponics system 100 to clone and/or grow healthy plants at optimal (or at least, reduced) cost. In accordance with some embodiments these plants are grown for research purposes. However, they can also be used for a variety of other purposes from being merely decorations to being used as a source of food, medicine, textiles, bioenergy etc. Once the plants have reached a user-selected level of maturity, the plants are removed from the system and transplanted into more conventional settings such as pots, planters, gardens, fields, etc.

One factor adversely affecting the costs associated with aeroponics systems 100 is the use of heretofore-available plant collars which can damage and/or contaminate the plants they are otherwise intended to hold and/or nurture. Another adverse cost actor is that heretofore-available plant collars, if reused, can expose their plants to pathogens, chemicals, etc. It has been shown that reusing heretofore-available plant collars in cloning machines decreases the yield of rooted cuttings. This is demonstrably a consequence of the accumulation of pathogens. Manufacturers and retailers, therefore, encourage the replacement of plant collars. But, cleaning these collars between propagation cycles only offers a modicum of improvement and consumes time and yet impedes automation and/or scaling of production.

Another point of interest with heretofore-available plant collars is the condition of these collars at the location at which plants contact these plant collars. On that note, these plant collars are die-cut from sheets of foam polymer in such a way that the closed cells within the foam are exposed. Moreover, a die-cut region therefore exists where the plants are embraced. This condition results in one of two (or both) potential events during subsequent use. First, the die-cutting of these collars causes an exponential increase in the surface area exposed to the environment. Accordingly the foam bodies of these collars can hold a greatly increased volume of water at such surfaces (by capillary action, adsorption and/or polymer absorption). Thus, this added surface area, has been shown to enhance bacterial and fungal colonization.

Additionally, the additional water encourages root growth within the collar. These ingrown roots often, as a consequence of the topology of these die-cut surfaces (and combined with most collars' limited density), grow into and/or through the plant collar. When removing the stem from these collars, the roots break and remain within the collar's cells and crevices. Since pathogens might feed on these root-fragments, re-use of these heretofore-available plant collars 106 can encourage pathogens to fester therein. Accordingly, heretofore-available plant collars tend to produce unhealthy, injured, or otherwise distressed plants. Collars of embodiments address some or all of these issues.

FIG. 1 illustrates ail aeroponics system 100 and its growing chambers 102, lids 104, a mister bar 105, heretofore-available plant collars 106, plant collars 108 of embodiments, a distressed plant 110, a healthy plant 112, distressed roots 114, healthy roots 116, slits 118, raised lips 120, slots 122, level surfaces 124, pores 126, rough surfaces 128, absorbed chemicals 130, a high intensity light 132, and an ozone generator 134.

Aeroponics systems 100 allow users to clone plants with reduced resources in that plants grown in these systems require no (or minimal) growth medium for their roots. Instead, these aeroponics systems 100 deliver water and nutrients (dissolved therein) directly to the plants via spray bars 105 pre-positioned for that purpose. Moreover, because the spray bars 105 deliver the mist directly to the roots, the users can precisely control the proportion of nutrients reaching the plants. In addition, aeroponics systems 100 allow oxygen (which is needed by the roots of the plants) to reach those roots while maintaining relatively sterile conditions within the growing chambers 102. Indeed, it is generally more difficult for diseases/pathogens to spread in the air of a growing chamber 102 than through the water, soil, or other growing media of other types of systems/environments.

Moreover, aeroponics systems 100 can provide for ozone generated by ozone generator 134 to sterilize areas, components, etc. of those systems and their environs. Of course, ozone is not the only chemical used in these systems. For instance, bleach and hydrogen peroxide are used to sterilize components of aeroponics systems 100 and are sometimes followed with applications of anti-bacterial soap. Other chemicals (and their byproducts) used in typical aeroponics systems 100 include (but are not limited to): bleach (sodium hypochlorite), hydrogen peroxide, chlorine dioxide, phosphoric acid, chlorine gas, ammonia, oxygen, peroxy radicals (from, for instance, UV induced degradation of neoprene), aqueous acids, bases, minerals, peroxides, hypochlorite salts, etc. At least some of these chemicals, in general, tend to degrade, corrode, etc. components which they come into contact with and, more particularly, heretofore-available plant collars 106.

Moreover, ecological concerns can be pertinent to the consumable (and/or disposable) use of plant collars. For example, general disposal of non-recycled plastics contributes to growth of landfills. Also, thioureas (substances often used in the vulcanization of neoprene) have been shown to cause allergies in some individuals and are known reprotoxins. On the other hand, incineration of certain plastics releases toxic chemical into the atmosphere. For example, polymers containing PVC may release dioxin during pyrolysis. [Most] heretofore-available plant collars 106 are made from chemicals known to generate; cause such problems. Plant collars 108 of embodiments are made of materials which resist degradation while neither containing nor causing thioureas, dioxins, and/or other chemicals to be released into the environment.

With continuing reference to FIG. 1, the high intensity light 132 represents a type of equipment typically found in aeroponics systems 100. It provides light for the plants and is often of such a nature that it produces significant UV (ultraviolet) light. The sun (which can be used to provide the light) also produces significant UV light. Regardless of its source, UV light can attack certain materials used in the components of the aeroponics systems 100 (i.e., heretofore-available plant collars 106) thereby leading to their degradation and/or failure. However, because the plants require light to grow, high intensity lights 132 remain in common use in the art.

The aeroponics system 100 illustrated in FIG. 1 includes many growing chambers 102. Each growing chamber 102 encloses a relatively sanitary inner volume into which the roots of the plants being cloned extend. Each growing chamber 102 of the current embodiment is capped by a lid 104 in which the plants are held with the roots extending downwardly therefrom and the stems of the plants extending generally upward therefrom. A plant collar holds each of the plants with a one to one correspondence and is clamped in place by compressive forces exerted on it by the lids 104. The plant collars illustrated by FIG. 1 come in many varieties two of which are illustrated. One of these collars is heretofore-available plant collar 106 while others are plant collars 108 of embodiments.

Detail view BB of FIG. 1 illustrates a heretofore-available plant collar 106 in additional detail. The heretofore-available plant collar 106 includes a generally disc shaped body defining two slits 118. One slit 118 extends from the periphery of the heretofore-available plant collar 106 toward and beyond its center and then onward for some distance. This slit 118 stops well before reaching the opposite side of the collar. A second slit 118 runs in a direction perpendicular to the first slit 118 and intersects it at an intersection point. Typically, users insert cuttings, seedlings, saplings, etc. through the heretofore-available plant collar 106 at the intersection of the two slits 118 as illustrated by FIG. 1. Necessarily, the edges of the slits 118 exert some force against the cutting (or plant). This force is indicated schematically in FIG. 1 via the raised lips 120 of the heretofore-available plant collar 106. Moreover, the slits 118 have relatively sharp edges or corners. As a result, the plant is often damaged and/or becomes unhealthy for such reasons. Others have attempted to work around such issues with collars having low density, Shore durometer, and/or compression set such that the chances of distressing the plants are somewhat lower. However, these collars lose their shapes and mechanically fail quickly.

Perhaps worse still, these slits 118 are die-cut into the foam of the heretofore-available plant collar 106. Thus, the pores 126 of these collars exposed thereby increasing the amount of water retained, absorbed, adsorbed, etc. by the plant collars That water, among other things, promotes colonization of the exposed pores 126 (and nearby areas) by various potentially pathogenic species including, mold, fungus, bacteria, etc. Again, these conditions can cause the plant to become an unhealthy, damaged, and/or distressed plant 110.

Further still, the surfaces exposed by cutting the slits becomes rough (due in part to the pores 126 and perhaps the action of the die damaging the foam through which it passes). The resulting rough surfaces 128 present yet another obstacle to producing healthy plants 112. For, more specifically, the roots of the distressed plant 110 often grow into the exposed pores 126, crevices, cracks, and other imperfections of the rough surfaces 128. The low density of many collars, moreover, allows the nascent root to penetrate into these collars. Thus, the combination of rough surfaces and low density of many previously available collars generally aggravates the situation. Thus, when users subsequently remove the distressed plants 110 from these heretofore-available plant collars 106, the distressed roots 114 (having grown into the collars) tear, break, are stripped of finer roots, etc. Clearly, these actions damage the distressed plant 110 leading to sub-par growth, disease, death, etc.

Moreover, repeated use of these heretofore-available plant collars 106 can create problems as well. More specifically, as the mechanical cycles on these collars accumulate, the foam of the collars fatigues, loses its compression set, flexibility, etc. As a result, the heretofore available plant collars 106 tend to increase the damage they inflict on the distressed plants 110 as their fatigue-susceptible bodies age. In addition, or in the alternative, these mechanical cycles eventually open cracks at the various stress risers (as well as elsewhere) on the heretofore-available plant collars 106. These stress risers include (but are not limited to) the termini of the slits and the points or corners where the slits 118 intersect (and not coincidentally hold the distressed plants 110).

In turn, these cracks exacerbate many of the foregoing problems as well as potentially creating others. For instance, with the aging of these collars, the slits rather the rough surfaces 128) tend to lose their ability to hold and/or grip the distressed plants 110. Users therefore tend to push the plants further into these aging and heretofore-available plant collars 106 perhaps without even realizing it. Moreover, even if inserted to the untended distance, the distressed plants 110 can slide further into these collars until something fortuitously stops them. For instance, a branch or node of some sort on the plant can stop its slide and/or the distressed roots 114 could encounter the bottom of the growing chamber 102. Regardless of why, or if, the slide stops, the distressed plant 110 ends up in a position too far into the growing chamber 102 and/or collar. Condition such as these often cause the distressed roots 114 to sprout at an actual location 136 higher on the plant than the intended location 138. These roots, now growing at a higher than desired level, can present difficulties when the distressed plant 110 is transplanted. Moreover, these attempts can and, often do, fail because of these problems.

With continuing reference to FIG. 1, heretofore-available plant collars 106 can also lead to the inadvertent introduction of chemicals into the growing chamber 102; the mist sprayed on the distressed roots 114; the distressed plant 110; etc. This is so because the exposed pores 126 and or the foams used for the collar bodies can absorb many chemicals. For instance, these heretofore-available plant collars 106 can absorb/hold these chemicals and re-release them when placed back in use. The released chemicals can therefore alter the chemistry of the water and be absorbed into the distressed plants 110. For such additional reasons, heretofore-available plant collars 106 can distress or even kill the plants they hold.

Still with reference to FIG. 1, plant collars 106 of embodiments can hold healthy plants 112 (or for that matter, distressed plants 110) without damaging or otherwise distressing them. More specifically, the configuration materials, and mechanical and/or chemical properties of plant collars 108 of the current embodiment can be user selected so as to avoid many if not all of the sources of plant distress disclosed herein. As detail view CC of FIG. 1 illustrates, the bodies of plant collars 106 can define bores or slots 122 which are relatively free (if not completely free) of rough surfaces 128. Instead, at least near the area which actually holds the healthy plants 112, such plant collars 108 can have smooth surfaces 140. Furthermore, in some embodiments, the mechanical properties of the plant collars 108 cause less mechanical stress on the healthy plants 112 held therein leading to less, or no, resulting damage to the healthy plants 112. This condition is reflected schematically in FIG. 1 by the absence of raised lips 120 on the level surfaces 124 of the plant collars 108. Furthermore, the plant collars 108 can be made from a closed-cell foam with chemical and/or mechanical properties selected to minimize and/or eliminate water and/or chemical absorption and/or adsorption (and subsequent re-release).

Figure 2:
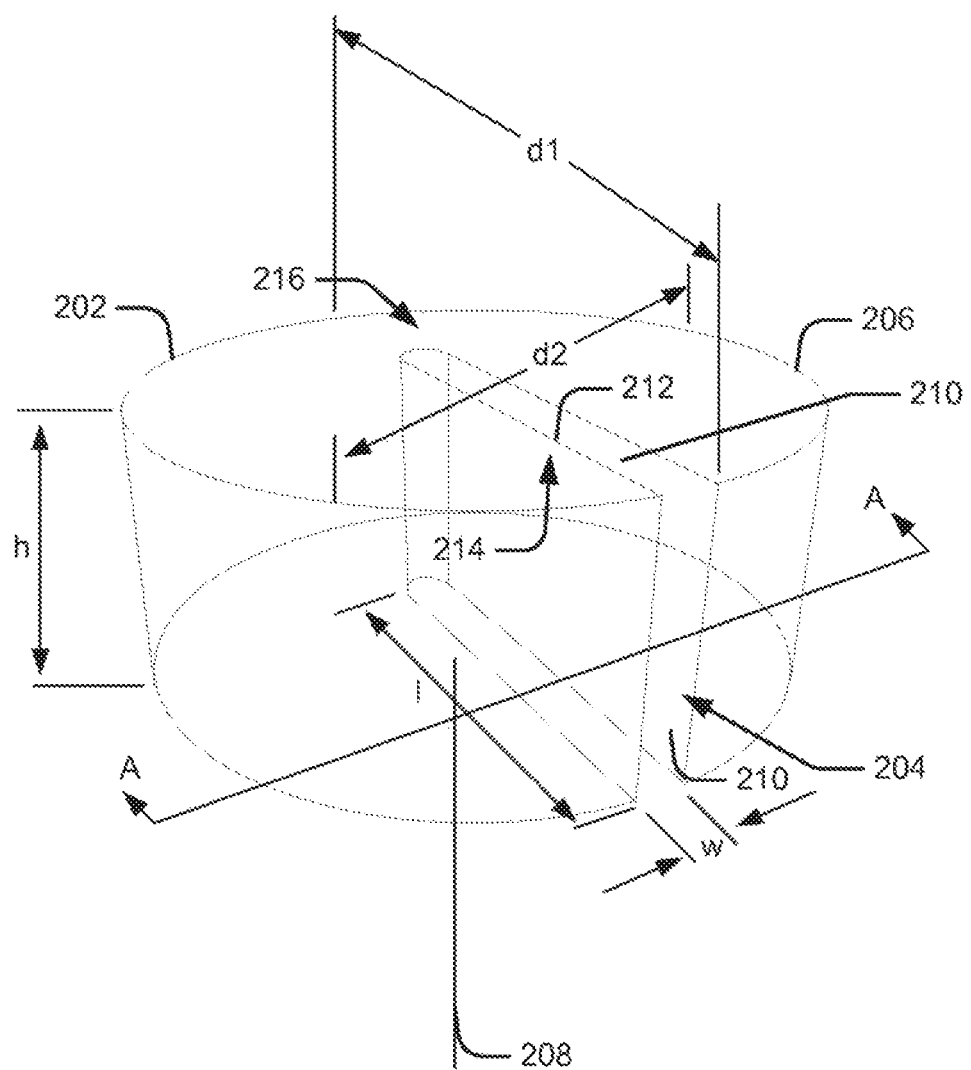
FIG. 2 illustrates a perspective view of a plant collar.

FIG. 2 illustrates a perspective view of a plant collar. Generally, FIG. 2 illustrates that the plant collar 200 is oval in shape although circular, oblong, and other shaped plant collars 200 are within the scope of the current disclosure. Moreover, FIG. 2 generally illustrates that the body 202 of the plant collar 200 of the current embodiment also defines a, variable-width slot 204 for holding plants therein. FIG. 2 also illustrates a periphery 206, a central axis 208, various smooth surfaces 210, plant contacting areas 212, adjacent volumes 214, a slot terminus 216, a slot width w, and a slot length l of the plant collar 200.

With continuing reference to FIG. 2, the body 202 of the plant collar 200 defines a number of features associated with the slot 204. For instance, it defines the walls of the slot and more specifically still, the smooth surfaces 210, the plant contacting areas 212, adjacent volumes 214, and the slot terminus 216. The body 202, moreover, can be formed by molding a closed cell foam in a mold with appropriate surface contours, vents, surface finish, clamping, release agents, etc. to allow the foam to form the body 202. Note that the surface finish can be selected to aid in the formation of a smooth, skin-like surface at selected (or all locations) on the exterior of the plant collars 200. In some embodiments, the mold is polished, burnished, etc. to commercially available finishes to do so.

Note that it is believed that during the formation of the body 202, the reacting components of the foam (and/or the still liquid foam itself) will foam (and/or create a plethora of bubbles therein). This foaming action (it is believed) will cause the bubbles to contact the mold walls; collapse; coat the mold walls with liquid foam; and build up along the walls as it begins curing. As the body 202 forms the surfaces of the body 202 will characteristically form such that they are smooth and/or are free from open pores, cracks, crevices, and voids likely to retain moisture, chemicals, etc. Thus, the body 202 can be formed with the slot 204 defined therein and with smooth surfaces 210 where desired such as at/near the plant contacting areas 212.

Moreover, the slot 204 having been formed with smooth, skin-like surfaces 210 can present no (or minimal) stress risers when empty and/or when holding a plant therein.

Notably, the slot terminus 216 can be a continuation of the smooth surfaces 210 and/or can be semi-circular in shape. Although other smoothly changing and/or curvilinear shapes can be defined by the slot terminus 216 of embodiments. Thus, the slot terminus 216 succeeds in presenting few or no stress risers.

With continuing reference to FIG. 2, the volumes 214 lie adjacent to areas of the slot 204 at which the body 202 might make long term contact with the plant it holds. These adjacent volumes 214 and/or other portions of the body 202 can be filled with, contain, be defined by, etc. polymers/copolymers having mechanical and/or chemical properties conducive to good plant health or at least not harmful thereto. For instance, the foam in the adjacent volumes 214 can have a compression set of about 25% as measured with a pressure of between 3 and 10 psi applied thereto. This range of compression sets has been found to prevent stressing the plant while still providing sufficient pressure thereon to hold the plant in place in the plant collar 200. Moreover, the foam in the adjacent volumes 214 can be resistant to retaining water. For instance, the material in the adjacent volumes can retain no more than about 5% water and, in some plant collars 200, no more than about 2% water by weight. Of course, the material in the adjacent volumes 214 can be formed at the same time and with the same material as the remainder of the body 202. However, plant collars 200 with separately formed adjacent volumes 214 are within the scope of the current embodiment. For instance, inserts can form and/or define the adjacent volumes 214 of embodiments.

Figure 3:
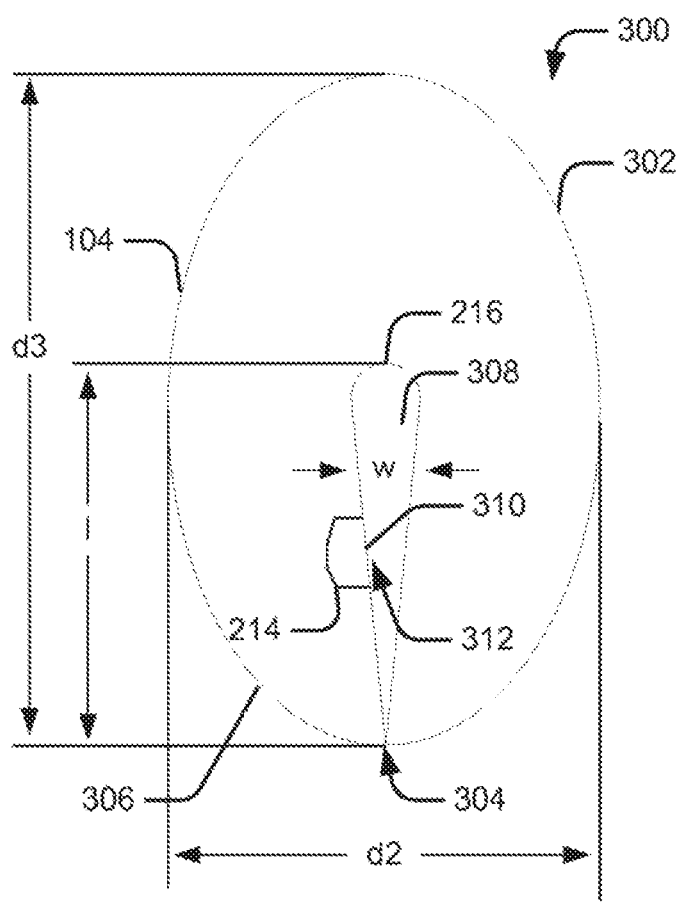
FIG. 3 illustrates a top plan view of a plant collar.

FIG. 3 illustrates a top plan view of a plant collar. More specifically, FIG. 3 shows the oval nature of the plant collar 302 of the current embodiment. It also shows a varying width w of the slot 304. That varying width w allows one plant collar 300 to hold plants of differing sizes. Smaller plants can be positioned and/or held in the plant collar 300 of the current embodiment at a location with a width w corresponding to that of these small plants. On the other hand, larger plants can be held by the plant collar 300 at a location along its length l corresponding to their sizes (as measured at a selected location along the stem where the plant is intended to be held). Moreover, as a held plant grows, it can be re-positioned in the slot 304 without introducing undue amounts of stress on the plant. This is so, in part, because the smooth surfaces 210 inhibit ingrowth of the roots into the body 202 of the plant collar 300 of the current embodiment. Note also, that the varying slot width w decreases near the periphery 306 thereby tending to trap plants in the slot 304. To some degree the decreasing width w of the slot 304 can cause the held plant to reposition itself as it grows and the force from the slot walls increase thereby pushing the plant toward the slot terminus 316 of the current embodiment. Of course, constant width slots 304 and slots 304 which increase in width as they approach the periphery are within the scope of the current disclosure.

Figure 4:
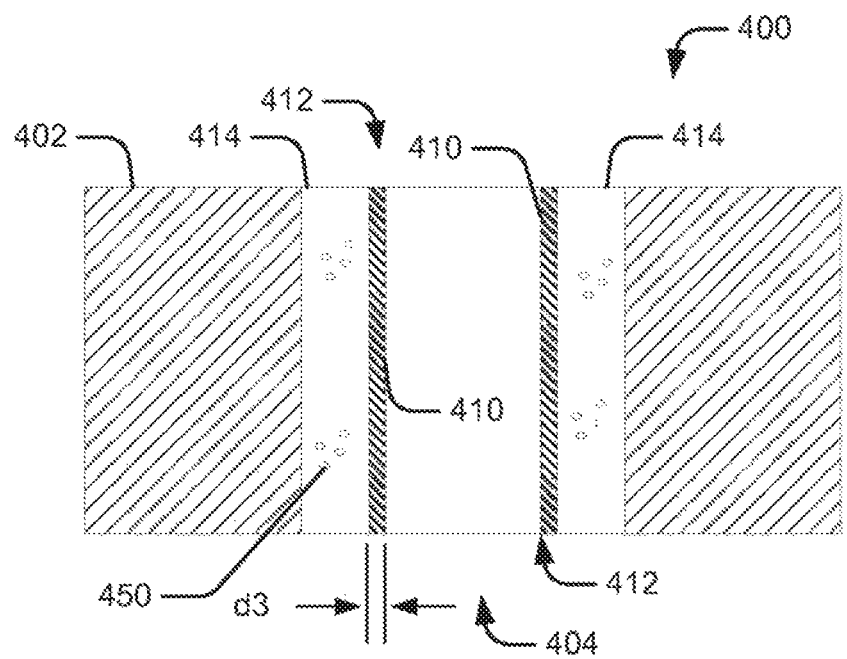
FIG. 4 illustrates a cross-sectional view of a plant collar as seen along line AA of FIG. 2.

FIG. 4 illustrates a cross-sectional view of a plant collar as seen along line CC of FIG. 2. Generally, FIG. 4 illustrates a cross section of a plant collar 400 of the current embodiment taken at a plant contacting area 412. It happens to be the case that this plant collar 400 is symmetric about the slot 404 although that need not be the case to be within the scope of the current embodiment. Working outwardly from the slot 404, the plant collar 400 possesses several features. For instance, the plant collar 400 of the current embodiment exhibits smooth surfaces 410. Of course, these "surfaces" have some appreciable depth d3 over which the curing foam (from which was formed) selectively coated the surface of the mold (in which it was made). The depth d3 can be on the order of millimeters. Thus, not only are these smooth surfaces 410 smooth, they are also solid in the sense that noticeable voids or pores can be absent at least relative to typical closed-cell foams. Thus, few (if any) voids exist within these smooth surfaces 410 in which moisture, chemicals, roots, etc. can accumulate, grow, etc.

Adjacent to and/or partially surrounding the smooth surfaces 410 and plant contacting areas 412 lie the adjacent volumes 414. Again, these adjacent volumes 414 can be defined by inserts, differing materials, etc. However, in many embodiments they (and/or the smooth surfaces 410) are made of a material(s) mechanically and/or chemically compatible with the health of the plants to be held by the plant collar 400.

In addition, or in the alternative, the adjacent volumes 414 (and/or other volumes in the body 402) can include certain species which selectively absorb microwave radiation. For instance, these species can be metallic particles, metal oxide particles, metal-coated particles, metal nanospheres, metal coated nanospheres etc. (available from Nanospectro Biosciences, Inc. of Houston, Tex.). It is believed that these nanoparticles/nanocrystals generate heat through plasmon resonance through which they absorb infrared light. They might also absorb microwave energy thereby generating heat for sterilization of nearby areas of the collars as well as areas in thermal communication therewith.

Moreover, because these absorbing species 450 can selectively absorb infrared wavelengths and convert them to heat, they can serve to aid in the sterilization of plant collars 400 of the current embodiment. More specifically, some of these microwave absorbing species 450 can warm/heat the polymer in their proximity (in a manner dependent upon their concentration) thereby potentially sterilizing biologic pathogens therein. Further still, the nearby foam can be selected to have good (or better) thermal conductivity so that this heat can sterilize areas/volumes much larger than that occupied by the microwave absorbing species 450 themselves. In some embodiments, the foam of the body 402 is silicone-based for that reason among others. It might also be useful to note that these microwave absorbing species can be distributed throughout the body 402 and/or concentrated in select areas (such as the smooth surfaces 410 and/or adjacent volumes 414). Moreover, non-foam but silicone-based (co) polymers can be made to work in similar fashions. Thus, blowing agents are not necessarily needed but care can be taken to generate such polymers with densities which inhibit root ingrowth into the resulting collars.

Figure 5:
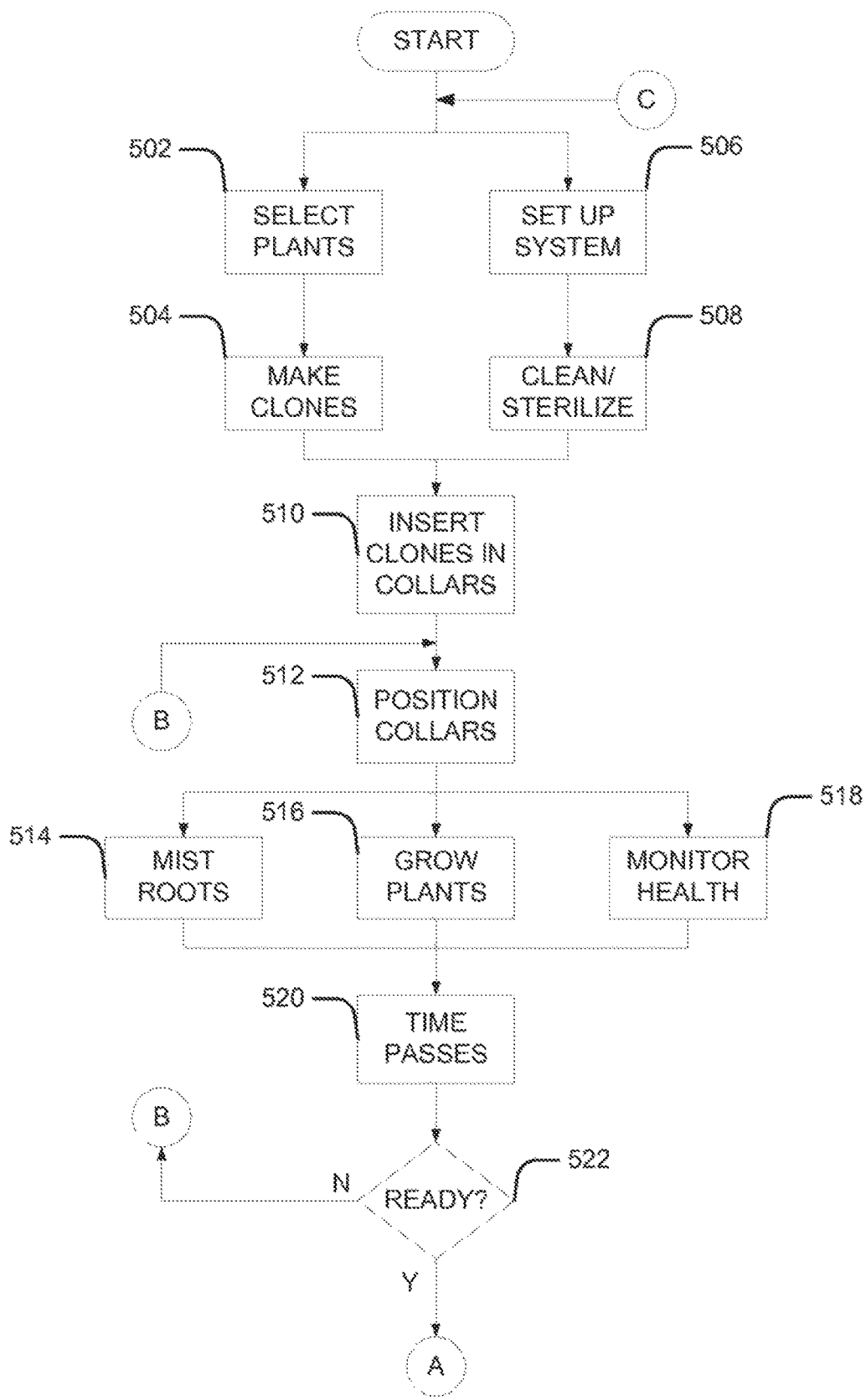
FIG. 5 illustrates a flowchart of a method related to using plant collars in an aeroponics system.
Figure 5:
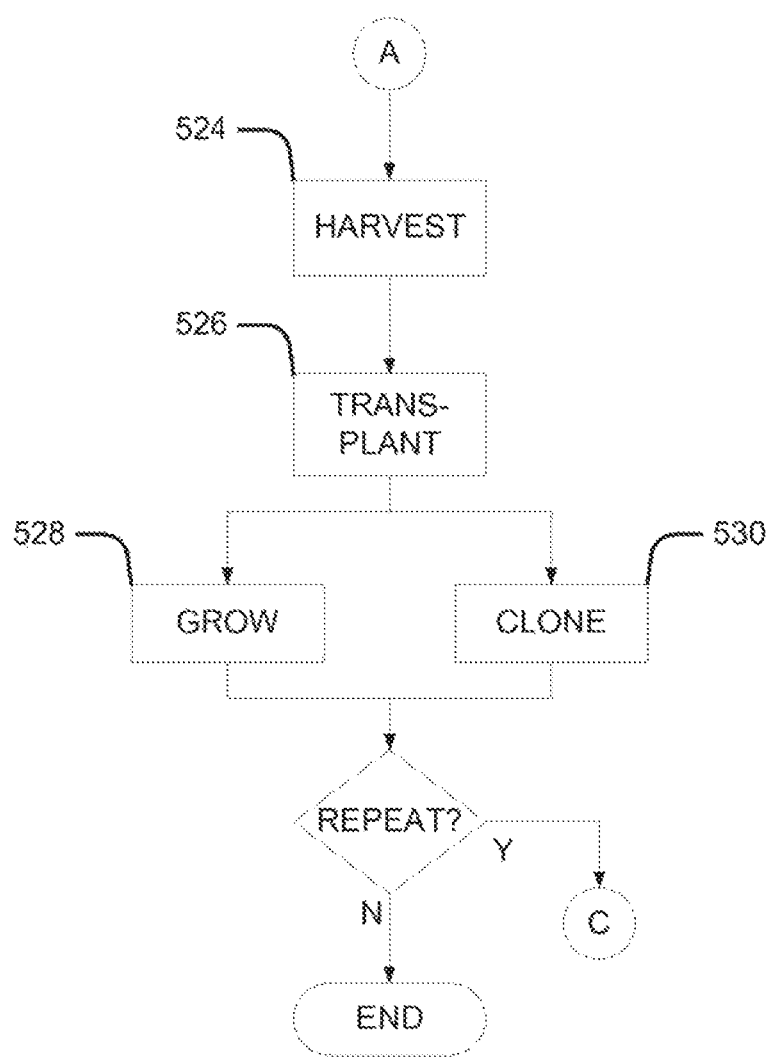

FIG. 5 illustrates a flowchart of a method related to using plant collars in an aeroponics system. The method 500 includes various operations such as selecting the types, species, etc. of plants to clone and/or grow in an aeroponics system 100 as illustrated at reference 502. Moreover, at some point, the cuttings, seedlings, saplings, etc. of the selected species can be created by, for instance, taking cuttings from pre-existing plants. In addition, or in the alternative, these plants can be grown from seeds. See reference 504.

In the meantime, a user(s) can set up the aeroponics system 100 of embodiments as indicated by reference 506. In other words, the user can select/design the growing chambers 102, lids 104, plant collars 108, etc. of the system as indicated by reference 506. Furthermore, the components which might come in contact with the plants can be cleaned and or sterilized. See reference 508. In accordance with embodiments, the cleaning can use various chemicals, techniques, and the like which the plant collars 108 can be configured to tolerate as disclosed elsewhere herein.

With continued reference to FIG. 5, method 500 can continue with the user inserting the cuttings into the plant collars 108 of embodiments. More specifically, they can position the cuttings n the slots 304 at locations where the widths w correspond to their size and/or at which the plant contacting areas 314 have smooth surfaces 310. Thus, the cuttings can be positioned so that the roots are likely to grow, sprout, etc. at the intended locations 138 rather than some other locations. See reference 512. With the cuttings positioned in the plant collars 108, the user can place the plant collars 108 into the lids 104 with the cuttings extending into the growing chamber 102.

Method 500 can proceed in accordance with embodiments. For instance, the aeroponics system 100 can be operated so as to mist the roots of the cuttings with water, nutrients, and the like. See reference 514. At reference, the plants can therefore grow (see reference 516) and hopefully attain a desired level of maturity, size, etc. In the meantime, the user can monitor the health of the plants and make changes to the system, the lid 104 the plant collars 108, and/or other aspects of the system/environment as conditions might suggest. See reference 518. Such operations can continue for a selected time, until selected conditions are satisfied, etc. For instance (as illustrated by reference 520), time can pass until the cuttings reach a certain level of maturity. If desired, the user can elect to have more time pass while waiting for such conditions to be satisfied as indicated by reference 522.

However, if the selected conditions are met (or otherwise), method 500 can continue at reference 524. For instance, now mature clones can be harvested from the aeroponics system 100 and/or removed from the plant collars 108. This operation can be accomplished without causing damage distress to the clones since the plant collars 108 of embodiments are configured to not distress the plants. Furthermore, in accordance with embodiments, the clones can be transplanted with healthy roots (at an appropriate location on the clones) into new growth media. See reference 526. The clones can be allowed to grow further (see reference 528) and/or can be used to create additional cuttings clones (see reference 530). Moreover, the method 500 can be repeated in whole or in part as illustrated by reference 532.

Figure 6:
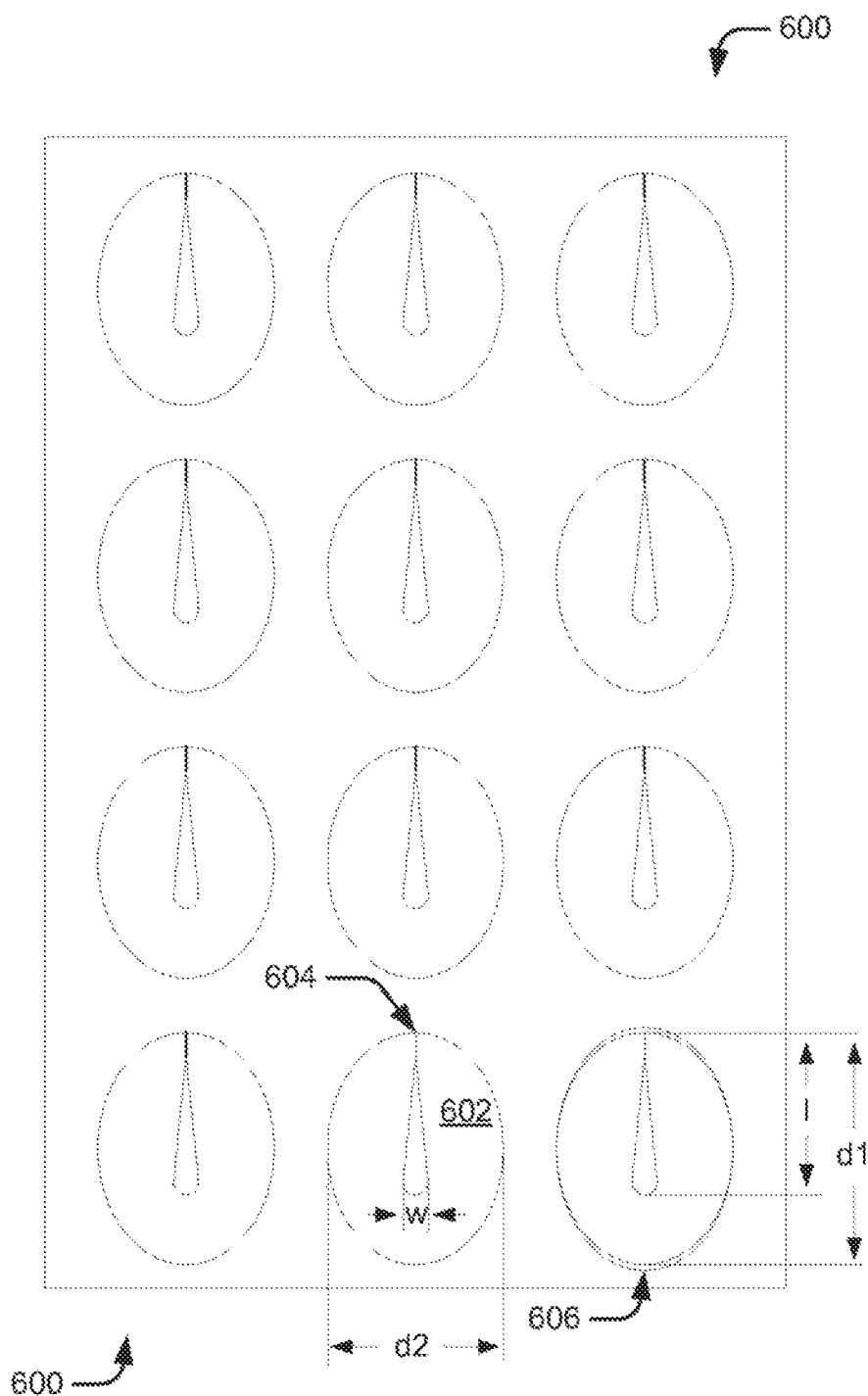
FIG. 6 illustrates a photograph of plant collars in a lid.

FIG. 6 illustrates a photograph of plant collars in a lid. Plant collars 600 of embodiments comprise various features. More specifically, FIG. 6 illustrates a plant collar 600 possessing a generally oval body 602 and a tapered, converging/diverging slot 604. Plant collars 600 of the some embodiments are cylindrical though and can possess varying diameters and/or heights. Heights of some plant collars 600 are between approximately one-half and approximately three-fourths of an inch. Plant collar diameters of the current embodiment range from approximately one-and-a-half inches to approximately two inches. Plant collars 600 intended for many mature plants tend to be larger in diameter than those intended for use with small, younger plants. Plant collars 600 of the current embodiment are typically black, but plant collars 600 possessing other colors are within the scope of the current disclosure.

In some embodiments, the plant collar 600 is molded as a unitary structure of, generally, closed-cell silicone foam containing iron (III) oxide. Moreover, the plant collar 600 is in the shape of an ellipsoidal cylinder with a first diameter d1 of 50.8 mm; a second diameter d2 approaching 48.8 mm; and a height h of 20 mm (see FIG. 2). The plant collar 600 of the current embodiment comprises a gap or slot 604 with a maximum width w of 3.0 mm and a length l of 34 mm and an arcuate terminus with a radius of 1.5 mm. The plant collar 600 of the current embodiment also comprises a 0.2 to 2 mm thick, smooth skin across surfaces with commercially available surface roughness across its exterior.

FIG. 6 also shows that the plant collar 600 of the current embodiment is generally oval, ellipsoidal, triangular, rectangular, etc. in shape. Collars having polygon-shaped bodies can work too. Indeed, some collars with 4 or fewer sides can work if one or more of the sides are fashioned to allow gaps between the collars and their lids thereby creating gradients of pressure/slot width w in their slots. These sides can be fashioned in a linear, curved, curvilinear fashion without departing from the scope of the disclosure. Further still, in some embodiments, the collars can define gaps between their periphery and the slot thereby allowing the gap to selectively absorb the clamping forces. Accordingly, such collars would impart less, potentially damaging pressure on the plants.

As is disclosed further herein, however, the oval shape of the plant collar 600 allows the collar 600 to better distribute the forces acting on it and hence on the plants which it might hold. It also allows heat and cleaning chemicals to reach more, if not all of its surfaces thereby leading to improved cleaning and sterilization of the plant collar 600. Moreover, the oval shape of plant collars of embodiments does so while clamped in the lid of many growing chambers 102 without requiring a modification of either heretofore-available clamps and/or lids 104. As a result, the (re)positioning of the plant in the plant collar 600 and the cleaning/sterilization of the plant collar 600 of the current embodiment can be automated to an extent not heretofore possible.

With continuing reference to FIG. 6, when the plant collar 600 is not in the clamp, the body 602 of the collar relaxes allowing the slot 604 to assume it's unstrained shape. For instance, the width w of the slot 604 can be constant along its length l. But, when clamped, the clamping force(s) squeezes the deflectable foam of the body 602 narrowing the slot 604. Indeed, in embodiments, even constant width w slots 604 assume a wedge, triangular, or otherwise variable width w shape. As a result plants of differing sizes can be inserted through the open space of the slot 604 where the width w is greater than the size, diameter, etc. of its stem. It can then be moved along the length l of the slot until the stem causes a user selected amount of deflection (which varies with the length l and/or size of the cutting) is observed in the foam of the body 602.

Since the reaction on the stem is largely proportional to the deflection, users can select how much force is exerted on the stem by the plant collar 600. Accordingly, the plants can be held securely in the plant collar 600 with the force desired while eliminating/minimizing chances that that desired force will be exceeded. Health plants are therefore more likely to be fostered by plant collars 600 of embodiments. Moreover, because some of the clamping force is distributed across the opposing surfaces of the slot 604 where they are pushed together, less force is applied to the plant than would otherwise be the case. In some embodiment the collar will have a stillness, modulus of elasticity, Young's Modulus, etc. low enough not to cause injury or impede growth of the plant, while being large enough to affix the collar and stem in place and allow for durable use. Further still, this situation allows for the use of denser foams than would otherwise be the case. Since plant collars 600 can be denser than previously available collars, roots are less likely to grow into the bodies 602 thereby avoiding distressing plants grown therein.

As FIG. 6 also shows, the oval shape of plant collars 600 of the current embodiment allows more surfaces of these plant collars 600 to be cleaned/sterilized more conveniently than with heretofore-available plant collars. For one thing, the oval shape allows a gap 606 to remain between a portion of the body's periphery. In contrast, a circular, collar sized for the same lid/clamp would be flush (and pressed) against the lid around its entire periphery. Thus, heat and/or cleaning/sterilization chemicals can reach the surfaces along the gap 606 directly and without user intervention. Moreover, because the bodies 602 are made of a polymer having higher thermal conductivity then heretofore-available plant collars 600, the heat from these open surfaces can more readily penetrate to interior portions of the plant collars 600 further aiding in their sterilization. The addition of Metal oxide improves heat conduction within polymers, also.

Moreover, the slots 604 of embodiments usually have some open area where the opposing walls are not forced together. Thus, these open surfaces can also receive heat and cleaning/sterilization chemicals directly. This condition is frequently so even when the plant collars 600 remain in their lids and while they are holding plants. Further still, when the plant collars 600 of embodiments are allowed to return to their unstrained shapes, the slots 604 re-open thereby exposing even more surface area to the direct application of heat and/or cleaning/sterilization chemicals. As a result, cleaning, sterilization, or a combination thereof of such plant collars 600 can be automated to an extent previously unobtainable.

For instance, if you place a heretofore-available plant collar in a bath of 3.0% peroxide and 0.8% bleach or (antimicrobial) soap, the bleach will typically reach the slit surfaces only after a great deal of soak time if at all. Growers who attempt to chemically clean/sterilize previously available collars must manually open each and every slit to allow the cleaning agents access to these surfaces. In contrast, the slots 604 of embodiments are open and accessible to such reagents. Merely soaking the plant collars 600 with/without some agitation in these reagents can therefore immediately expose these surfaces to the cleaning/sterilization agents without manually opening these collars 604.

In accordance with the current embodiment, plant collars 600 are made through compression molding by protocols such as the following. Blended at room temperature in a dough mixer are the following: 11 parts by weight (pbw) trimethylsiloxy terminated polymethylhydrogensiloxane containing 1.5 weight percent silicone bonded hydrogen atoms and having a viscosity of approximately 20 centistokes (cs); 0.1 parts 1-ethynyl-1-cyclohexanol, 0.006 pbw chloroplatonic acid (delivered in a isopropanol carrier containing 4 to 10 percent by weight chloroplatonic acid), 9 pbw reinforcing fumed silica, and 1 pbw finely milled iron III oxide. Upon mixing to homogeneity, the following ingredients are added on a dough mixture at approximately 75 degrees Celsius: 100 parts silanol-terminated dimethylpolysiloxane gum having a viscosity between 1,000,000 and 50,000,000 centistokes (cs), hydroxyl-terminated polydimethylsiloxane containing 4 percent by weight silicone bonded hydroxyl groups, and two pbw isopropanol. After further mixing at 60 degrees Celsius, approximately 30 milliliters of the mixture was loaded into the assembled, previously defined mold preheated to approximately 180 degrees Celsius. Once exposed to the hot mold, one can move quickly because the mixtures have begun foaming and curing. With the mold vent facing up and sealed tightly, this combination is heated at 180 degrees Celsius for 30 minutes ultimately forming elastomeric closed-cellular foam with a smooth outer skin.

With regard to the preceding protocol, it is noted here that many other protocols can be used to form plant collars 600. However, it is believed that the silanol-terminated dimethylpolysiloxane and the hydroxy terminated polydimethylsiloxane of the preceding protocol react to form the underlying polymer of the resulting silicone. Moreover, it is believe that the trimethylsiloxy-terminated polymethyl-hydrogensiloxane promotes cross-linkage between the various polymer structures being formed in the plant collars 600. It is also believed that the 1-ethynyl-1-cyclohexanol acts as an inhibitor giving the reactants time to mix before reacting while the chloroplatonic acid acts as a catalyst. The 1-ethynyl-1-cyclohexanol also assists in reducing the compression set of the resulting foam. Furthermore, it is believed that the isopropanol improves (i.e., increases) elasticity in the resulting silicone. The fumed silica (or finely ground quartz) increases the density of the plant collars 600 and provides for a more inert surface. It also reinforces the polymer without significantly affecting its compression set/hardness of the polymer if used in moderation. The iron oxide, of the current embodiment, is believed to increase the absorption of microwave energy and hence enhances microwave sterilization of the resulting silicone.

Plant collars 600 of embodiments can hold less than 2% by weight aqueous mixtures by mass, have a compression set less than 5% at 70 degrees Celsius, and a density approximating 0.4 grams per cubic centimeter. Plant collars 600 of embodiments possess differing geometric dimensions so as to be compatible with the many hydroponic and/or aeroponic machines currently in use (and/or that might arise in the future) to propagate, clone and/or cultivate plants.

Plant collars 600 of embodiments can withstand high temperature sterilization techniques. For example, slant collars 600 of embodiments can withstand dry heat sterilization of 160 degrees Celsius for two hours; microwave sterilization at 2450 MHz for over 5 minutes at 900 watts; and/or steam autoclave temperatures at 15 psi, 120 degrees Celsius for more than 30 minutes. Collars of the current embodiment have been found to tolerate such relatively lengthy sterilization techniques well. Plant collars 600 of some embodiments can withstand sterilization in pressure cookers and/or autoclaves at 121 degrees Celsius and 15-30 psig. Other embodiments may withstand different thresholds of some or all of these conditions.

Of course, the metal species chosen for making collars of the current embodiment can be chosen in conjunction with the type of electromagnetic energy which users might wish to use to sterilize the collars. For instance, plasmon resonance activation energy for the creation of heat generally lies in the infrared spectrum (about 390 nm to about 750 nm wavelengths). Microwave energy typically used for such purposes generally lies between about 1 mm to about 1 meter in wavelength with many commercially available microwave ovens using wavelengths between about 122 mm to about 328 mm wavelengths (or approximately 2.45 GHz- to approximately 915 MHz). Thus, the metallic species selected for a given collar(s) can be tailored to work with the sterilization techniques to be used and/or vise versa.

Plant collars 600 of the current embodiment are made of silicone which has been shown to tolerate gamma radiation, electron beam radiation, and ethylene oxide sterilization methods without significant loss of physical properties. Since many silicones have thermal conductivity at or above that of many resinous or organic rubbers, moreover, plant collars 600 made of silicone can be easier to clean/sterilize than those made of other materials.

No cellular silicone elastomers containing similar additives have been found to work well also. Thus, collars of embodiments are made using condensation-cure elastomers with compression sets of approximately 10 Shore A Hardness). Fluorocarbon elastomers (such as polyvinyledene fluoride-co-hexas-flouropropene) can be used to form collars or embodiments. While relatively more expensive, such collars can handle higher temperatures and more extreme conditions provided that their use is compatible with the hydrocarbon containing halogens associated with such materials In some embodiments the collar comprises microwavable-absorbing or detecting molecules, ions, and/or reduced metals to facilitate shorter and/or more effective microwave sterilization. More specifically, when metal oxides are used for such purposes, it has been found that they tend to increase the thermal conductivity of the collars as a whole. These may be included as admixtures or covalently linked to side groups in the polymer. In some embodiments, plant collars may comprise nanoparticles comprising metallic outer nanoshells such that they absorb infrared light and/or emit heat through plasmon resonance. Such materials can also fluoresce from certain visible/UV frequencies to infrared frequencies further enhancing their heat-sterilizing properties in plant collars of embodiment. Various additives may also be used to further enhance one or more properties. It might now be helpful to consider a mold for making collars of embodiments.

Figure 7:
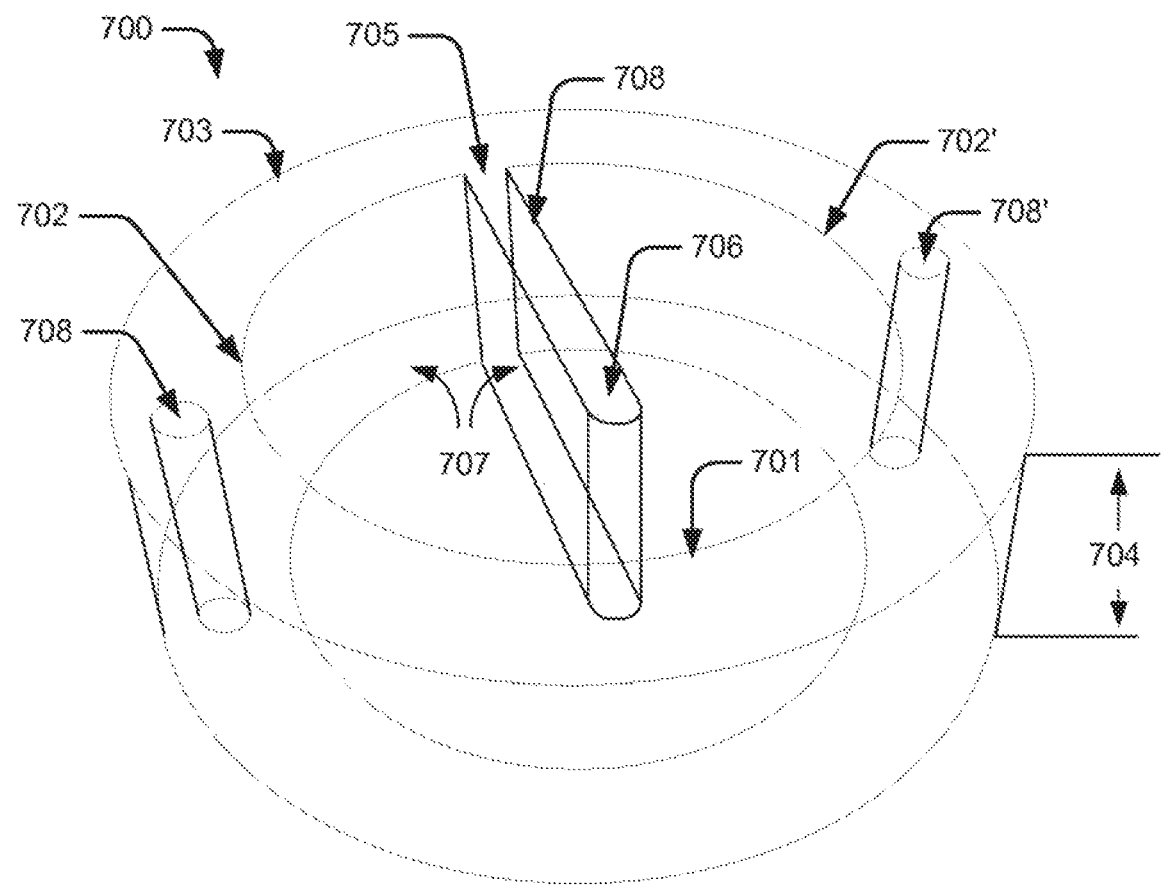
FIG. 7 depicts a perspective view of a mold for a durable, sterilizable plant collar.

FIG. 7 depicts a perspective view of a mold for a durable, sterilizable plant collar. In the current embodiment the mold is made by CNC directed cutting of a 60 mm×60 mm×20 mm block of a stainless steel such as 316LVM. Such molds form a cavity in the shape of an ellipse with a first diameter 702, 702' of 50.8 mm and second diameter 701 (perpendicular to 702, 702') of 48.8 mm. The mold has a height 704 of 20 mm. A protrusion 705 for forming slots has a width of 3.0 mm; a length 708 of approximately of 34 mm; and a half-circle terminus 706 with a radius of 1.5 mm. The total length of the protrusion 705 of the current embodiment at its half-circle terminus is approximately 35.5 mm. The surface of the inner cavity 707 is polished and buffed to improve surface tension. This can be done to improve the topology and/or surface finish of the molded part. Moreover, it is believed that doing so tends to improve the quality of the skin-like surfaces of plant collars disclosed elsewhere herein. Orifices 708, 708' with diameters of 4 mm are made for using bolts to attach the cap illustrated in FIG. 8 and to secure it in pace during molding activities. These holes 708, 708' are centered at 29.0 mm from the central axis of the mold, are drilled along the axis which is parallel to the height 704 of the mold, and perpendicular to length 378 of the protrusion.

Figure 8:
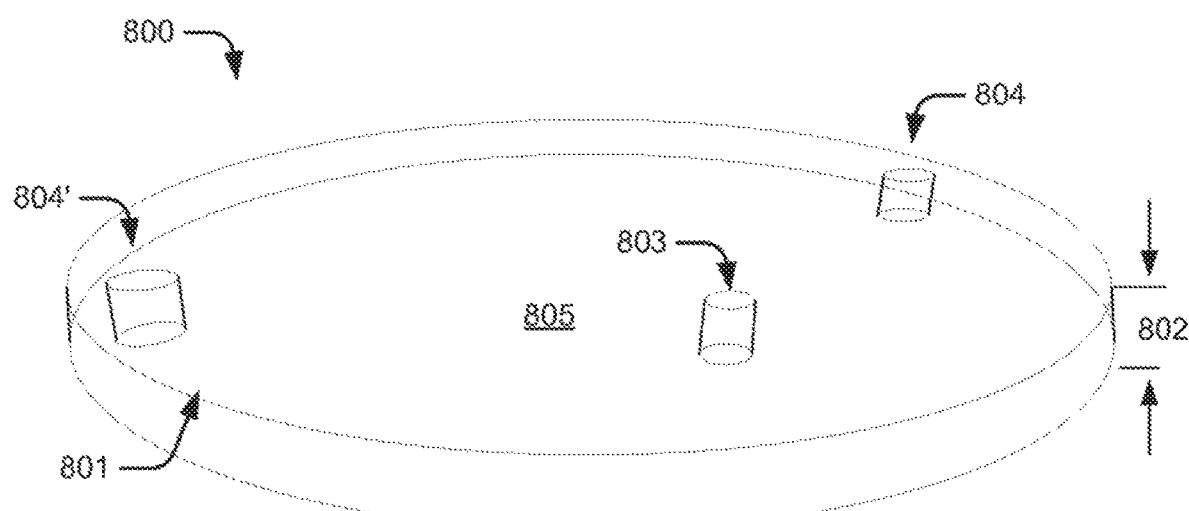
FIG. 8 depicts a perspective view of cap for a mold for a durable, sterilizable plant collar.

FIG. 8 depicts a perspective view of cap for a mold for a durable, sterilizable plant collar. The top cap 800 can be any shape, and usually includes the orifices 804, 804' and is usually able to close the middle mold. For molds of the current embodiment, the cap has a radius 801 of 60 mm about the central axis of the cap with a height 802 of approximately 4 mm. The two orifices 804, 804' are centered 29.0 mm from the central axis and share the same axis parallel to the top surface 805 of cap 800 of the current embodiment. Perpendicular to the axis of orifices 804, 804' is a vent hole 803, centered 18.0 mm from the central axis of the cap 800, and along the same plane formed by surface 805. One of this vent's functions can be to release excess expanded foam from the mold while curing. The bottom side 806 of caps 800 of the current embodiment are polished and buffed to improve the surface tension where contact is made with the expanded foam.

The current embodiment also provides a second cap similar to the above described cap. One of the caps, though, should exclude the vent hole 803 so that the combined mold can be turned on one side or the other such that it will retain the materials injected into it. Thus, when the caps close the mold (held in place by 4 mm bolts fed through the orifices 804, 804', 708, and 708'), a cavity containing a volume of approximately 38 mL is formed. The cap 800 with the vent 803 can be oriented on the mold such that vent 803 is not over the protrusion 805. If desired, attention can be paid to ensuring the polished and buffed surfaces of the caps are facing the inner cavity defined by the mold.

CONCLUSION

Although the subject matter has been disclosed in language specific to structural features and/or methodological acts, it is to be understood that the subject matter defined in the appended claims is not necessarily limited to the specific features or acts disclosed above. Rather, the specific features and acts described herein are disclosed as illustrative implementations of the claims.

The invention claimed is:

1. A hydroponics plant collar comprising:
a body defining:
a thickness, a center, and a periphery;
a slot extending from the periphery and generally toward the center;
a terminus of the slot and a surface thereof; and
two opposing slot surfaces which define smooth plant contact portions thereof
and which are spaced apart from one another whereby the body distributes forces acting on the hydroponics plant collar and on a plant to be is the slot; and
metallic nanospheres dispersed throughout the body.

2. The hydroponics plant collar of claim 1, wherein the surface of the terminus is semi-circular.

3. The hydroponics plant collar of claim 1, wherein the body possesses a compressive strength allowing about a 25% deflection when a pressure between about 3 and 10 psi is applied thereto.

4. The hydroponics plant collar of claim 1, wherein the body is elliptical in shape.

5. The hydroponics plant collar of claim 1, wherein the surface of the terminus of the slot is substantially free of stress risers.

6. The hydroponics plant collar of claim 1, wherein the slot at least partially converges near the periphery.

7. A hydroponics plant collar comprising:
a body defining:
a thickness, a center, and a periphery
a slot extending from the periphery and toward the center;
a smooth plant contact surface in the slot;
a volume in the body adjacent to the smooth plant contact surface; and
wherein the body includes metallic nanospheres dispersed throughout die oval body;
wherein the volume adjacent to the plant contact surface further comprises a closed cell foam to distribute forces acting on the hydroponics plant collar.

8. The hydroponics plant collar of claim 7, wherein the closed cell foam is silicone based.

9. The hydroponics plant collar of claim 7, wherein metallic nanospheres selectively absorb microwave radiation.

10. The hydroponics plant collar of claim 7, wherein the body is oval in shape.

11. A hydroponics plant collar comprising:
a body defining a periphery, a slot, a slot and a plant contact area of the slot wall; and
wherein:
the plant contact area is smooth and made of a closed cell, silicone based cellular elastomer,
the closed cell, silicone based, cellular elastomer foam further comprises a species which selectively absorbs microwave radiation whereby the oval body distributes forces acting on the hydroponics plant collar and on a plant to be in the slot;
the microwave absorbing species is coated on a nanosphere.

12. The hydroponics plant collar of claim 11, wherein the microwave absorbing species is metallic.

13. The hydroponics plant collar of claim 12, wherein the metallic species contains iron.

14. The hydroponics plant collar of claim 13, wherein the metallic species is $Fe(III)O_2$.

15. The hydroponics plant collar of claim 11, wherein the body is oval in shape.

16. The hydroponics plant collar of claim 11, wherein the volume adjacent to the plant contact surface absorbs no more than about 5% water by weight.

17. The hydroponics plant collar of claim 16, wherein the volume adjacent to the plant contact surface absorbs no more than about 2% water by weight.

18. The hydroponics plant collar of claim 11, wherein the body is chemically compatible with bleach and hydrogen peroxide.

19. The hydroponics plant collar of claim 11, wherein the body is elliptical in shape.

20. The hydroponics plant collar of claim 11 wherein the slot at least partially converges near the periphery.

* * * * *